(12) United States Patent
Liu (10) Patent No.: US 10,601,975 B2
(45) Date of Patent: Mar. 24, 2020

(54) VEHICLE-MOUNTED MOBILE PHONE HOLDER AND RING BUCKLE

(71) Applicant: Jianbo Liu, Huizhou (CN)

(72) Inventor: Jianbo Liu, Huizhou (CN)

(*) Notice: Subject to any disclaimer, the term of this patent is extended or adjusted under 35 U.S.C. 154(b) by 0 days.

(21) Appl. No.: 16/131,471

(22) Filed: Sep. 14, 2018

(65) Prior Publication Data
US 2019/0268457 A1    Aug. 29, 2019

(30) Foreign Application Priority Data
Feb. 23, 2018 (CN) .......................... 2018202648440

(51) Int. Cl.
| | |
|---|---|
| H04M 1/12 | (2006.01) |
| B60R 11/02 | (2006.01) |
| H02J 7/02 | (2016.01) |
| B60R 11/00 | (2006.01) |
| H04M 1/04 | (2006.01) |

(52) U.S. Cl.
CPC ............... *H04M 1/12* (2013.01); *B60R 11/02* (2013.01); *B60R 11/0241* (2013.01); *B60R 2011/007* (2013.01); *B60R 2011/0008* (2013.01); *B60R 2011/0059* (2013.01); *B60R 2011/0087* (2013.01); *H02J 7/025* (2013.01); *H04M 1/04* (2013.01)

(58) Field of Classification Search
CPC .... H04M 1/04; B60R 11/0241; H04B 1/3877; H04B 1/3888
See application file for complete search history.

(56) References Cited

U.S. PATENT DOCUMENTS

| | | | | |
|---|---|---|---|---|
| 5,850,996 A | * | 12/1998 | Liang ........................ | A45F 5/02 |
| | | | | 248/221.11 |
| 7,162,281 B2 | * | 1/2007 | Kim ......................... | A45F 5/02 |
| | | | | 224/196 |
| 2018/0134233 A1 | * | 5/2018 | Kim .................... | B60R 11/0241 |

* cited by examiner

*Primary Examiner* — Nam T Huynh
(74) *Attorney, Agent, or Firm* — Bay State IP, LLC (57) ABSTRACT

This disclosure relates to a vehicle-mounted mobile phone holder and a ring buckle. The mobile phone holder comprises a first connecting part, a second connecting part and a middle part; the first connecting part is used for being connected to the mobile phone, at least one card slot is formed in the first connecting part, and at least one card entrance is formed in the card slot; the middle part at least at least comprises a universal connecting end, the universal connecting end is connected with the first connecting part or the second connecting part. The ring buckle comprises a buckle part, a rotary part and a fixed part, the buckle part is connected to the rotary part through a connecting shaft, the rotary part is connected onto the fixed part through a rotating shaft, the fixed part is adhered into the mobile phone.

6 Claims, 7 Drawing Sheets

VEHICLE-MOUNTED MOBILE PHONE HOLDER AND RING BUCKLE

CROSS REFERENCE TO RELATED APPLICATION

This application claims the benefit of and takes priority from Chinese Patent application Serial No. 2018202648440 filed on Feb. 23, 2018, the contents of which are herein incorporated by reference.

TECHNICAL FIELD

This disclosure relates to the field of mobile phone holders, in particular to a vehicle-mounted mobile phone holder and a ring buckle matched with the holder.

BACKGROUND

Existing vehicle-mounted mobile phone holders are generally divided into three types, namely, a mobile phone is clamped onto the first type of holder through a clamping mechanism, an adsorption mechanism mostly with magnetic adsorption is arranged on the second type of holder, and the third type of holder is arranged on an automobile instrument desk and a mobile phone is placed on the holder in virtue of the dead weight of the mobile phone. Different problems exist in the three types of existing holders respectively; the first type of holder with the clamping structure is inconvenient to clamp and is incapable of single-hand operation; the second type of holder is convenient to take, but the operation of an internal circuit of the mobile phone can be influenced by magnetic adsorption, and the signal of the mobile phone is influenced and is incompatible with a ring of the mobile phone; the third type of holder is convenient to take, the circuit of the mobile phone cannot be influenced, but the mobile phone is only adjusted horizontally and cannot be adjusted in vertical angles.

The information disclosed in this background section is only for enhancement of understanding of the general background of this disclosure, and is not regarded as admitting or suggesting in any form that the information forms the prior art that is already known to a person of ordinary skill in the art.

SUMMARY

In order to solve the above problem existing in the prior art, this disclosure provides a vehicle-mounted mobile phone holder and a ring buckle. By adopting a unique structural design, the mobile phone holder can realize single-hand taking of a mobile phone, the mobile phone is convenient to take, the operating state, particularly a wireless charging function, of the mobile phone is not influenced, and moreover, the adjustment for the mobile phone in any angle can also be realized.

The technical scheme adopted for solving the technical problem in this disclosure is as follows: the mobile phone holder comprises a first connecting part, a second connecting part and a middle part; the first connecting part is used for being connected to the mobile phone, at least one card slot is formed in the first connecting part, and at least one card entrance is formed in the card slot.

The middle part at least comprises a universal connecting end, the universal connecting end is connected with the first connecting part or the second connecting part; and the second connecting part is used for being connected onto an automobile.

The technical scheme adopted for solving the technical problem in this disclosure is further as follows: the card slot is a U-shaped card slot, and the slot wall of the U-shaped card slot is an internally inclined plane.

The technical scheme adopted for solving the technical problem in this disclosure is further as follows: a guiding part is arranged at the position of the card entrance and is used for guiding a ring into the card slot.

The technical scheme adopted for solving the technical problem in this disclosure is further as follows: the first connecting part is internally provided with a wireless charging module for wirelessly charging the mobile phone.

The technical scheme adopted for solving the technical problem in this disclosure is further as follows: the first connecting part comprises an upper connecting part and a lower connecting part, the card slot is formed in the upper connecting part, the wireless charging module is arranged inside the upper connecting part, and the upper connecting part is further internally provided with a storage battery; a charging port is formed in the lower connecting part, the upper connecting part and the lower connecting part are connected detachably, and when the upper connecting part and the lower connecting part are connected together, the storage battery inside the upper connecting part can be charged.

The technical scheme adopted for solving the technical problem in this disclosure is further as follows: one end of the middle part is the universal connecting end, and the universal connecting end is connected to the first connecting part.

The technical scheme adopted for solving the technical problem in this disclosure is further as follows: the connection of the second connecting part is one of clamping connection manner and adhering connection manner.

The technical scheme adopted for solving the technical problem in this disclosure is further as follows: the second connecting part comprises an opening and closing wrench, a first clamping plate, a second clamping plate, a shell and a spring, the opening and closing wrench and the second clamping plate are in sliding fit with the shell, the opening and closing wrench is connected with the second clamping plate, the first clamping plate is fixedly matched with the shell, and the spring acts on the opening and closing wrench.

The technical scheme adopted for solving the technical problem in this disclosure is further as follows: anti-skid layers are arranged on the inner side of the first clamping plate and the inner side of the second clamping plate respectively.

The technical scheme adopted for solving the technical problem in this disclosure is further as follows: the ring buckle comprises a buckle part, a rotary part and a fixed part, the buckle part is connected to the rotary part through a connecting shaft, the rotary part is connected onto the fixed part through a rotating shaft, the fixed part is adhered into the mobile phone, the buckle part can be clamped onto the vehicle-mounted holder, and the ring buckle is made of non-metal.

The technical scheme adopted for solving the technical problem in this disclosure is further as follows: the outer wall of the buckle part is arranged in an inclined manner, and the inclination direction is opposite to the slot wall of the card slot of the vehicle-mounted holder.

By adopting the technical schemes, this disclosure has the following beneficial effects:

The ring buckle is fixed onto the holder in a clamping manner, single-hand taking can be realized, and the operating state (such signal) of the mobile phone is not influenced, particularly, the wireless charging function of the mobile phone cannot be influenced, and moreover, the adjustment for the mobile phone in any angle can also be realized.

BRIEF DESCRIPTION OF THE DRAWINGS

In order to illustrate the technical scheme in the embodiment of this disclosure or in the prior art more clearly, the accompanying diagrams needing to be used in the embodiment or in the description in the prior art are simply described. Apparently, the embodiments in the following description are merely a part rather than all of the embodiments of this disclosure. For any person skilled in the art, under the premise of without contributing creative labor, other accompanying diagrams further can be obtained according to these accompanying diagrams.

DESCRIPTION OF THE EMBODIMENTS

In order to make the purpose, technical scheme and advantages of the embodiment of this disclosure clearer, the technical schemes in the embodiments of this disclosure are clearly and completely described in the following with reference to the accompanying drawings in this disclosure. Apparently, the embodiments in the following description are merely a part rather than all of the embodiments of this disclosure. Generally, the described and illustrated components of the embodiments of this disclosure in the accompanying drawings can be arranged and designed through various different configurations.

Therefore, the detailed description of the embodiments of this disclosure provided in the accompanying drawings is not intended to restrict the protected scope of this disclosure, but merely represents the selected embodiment of this disclosure. Based on the embodiment in this disclosure, all other embodiments obtained by the ordinary technical staff in the art under the premise of without contributing creative labor belong to the scope protected by this disclosure.

It is noted that similar labels and alphabets represent similar items in the following accompanying diagrams, and thus, once a certain item is defined in one accompanying diagram, the item does not need to be further defined and described in the following accompanying diagrams.

In the description of this disclosure, it needs to be illustrated that the indicative direction or position relations of the terms such as "center", "upper", "lower", "left", "right", "vertical", "horizontal", "inside" and "outside" are direction or position relations illustrated based on the accompanying diagrams, or the frequently placing direction or position relations when the product in this disclosure is used, just for facilitating the description of this disclosure and simplifying the description, but not for indicating or hinting that the indicated device or element must be in a specific direction and is constructed and operated in the specific direction, the terms cannot be understood as the restriction of this disclosure. Moreover, the terms such as "first", "second" and "third" are just used for distinguishing the description, but cannot be understood to indicate or hint relative importance.

Moreover, the terms such as "horizontal" and "vertical" do not represent that the components need to be horizontal or overhang absolutely, but can be slightly inclined. For example, the term "horizontal" just indicates that the direction is relatively horizontal relative to "vertical", but does not represent that the structure must be completely horizontal and can be slightly inclined.

In the description of this disclosure, it further needs to be illustrated that, except as otherwise noted, the terms such as "arrange", "install", "link" and "connect" should be generally understood, for example, the components can be fixedly connected, and also can be detachably connected or integrally connected; the components can be mechanically connected, and also can be electrically connected; the components can be directly connected, also can be indirectly connected through an intermediate, and the interiors of two components can communicate with each other. For any person skilled in the art, the specific meanings of the terms in this disclosure can be understood according to specific conditions.

Embodiment I

Figure 1:
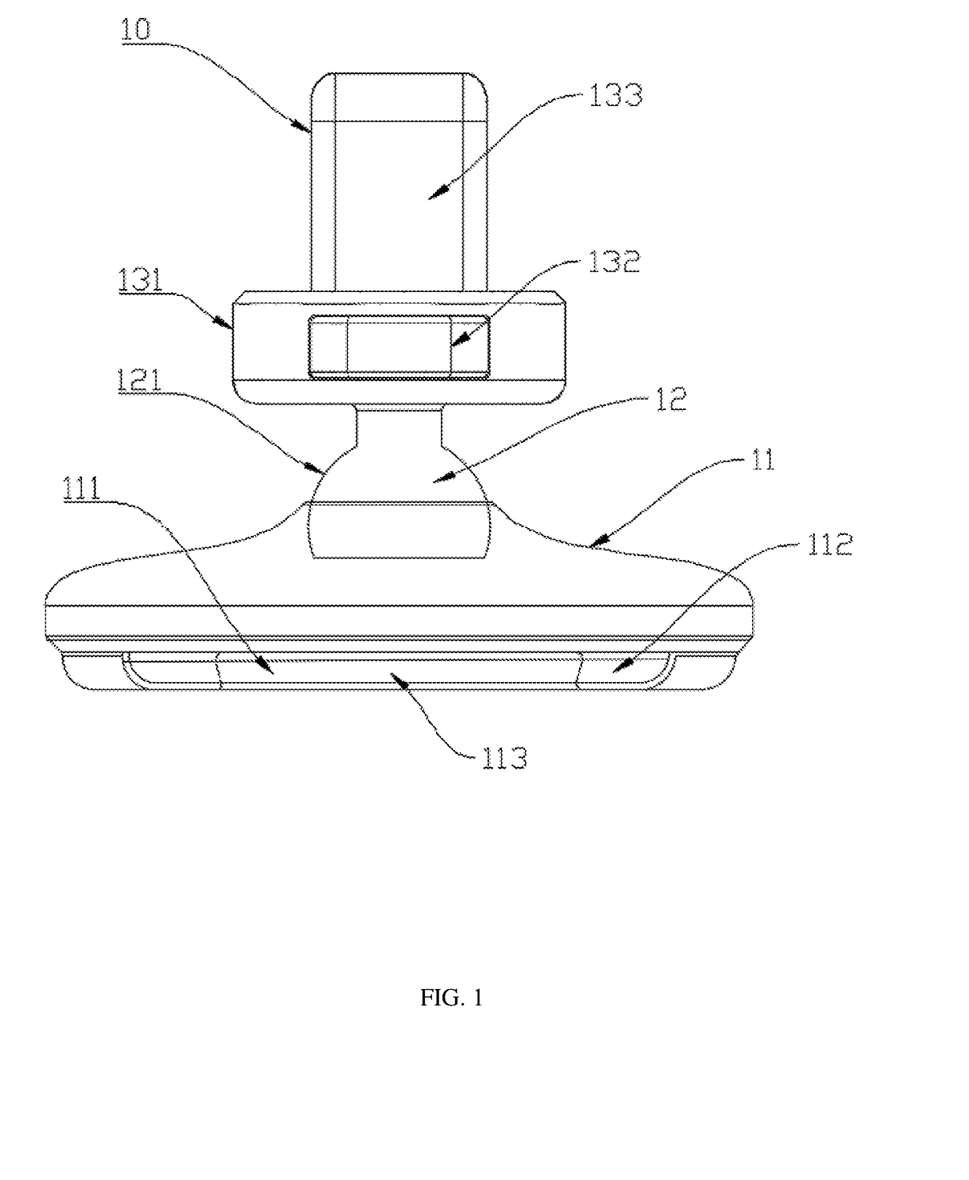
FIG. 1 is a structure diagram of a vehicle-mounted mobile phone holder.
Figure 2:
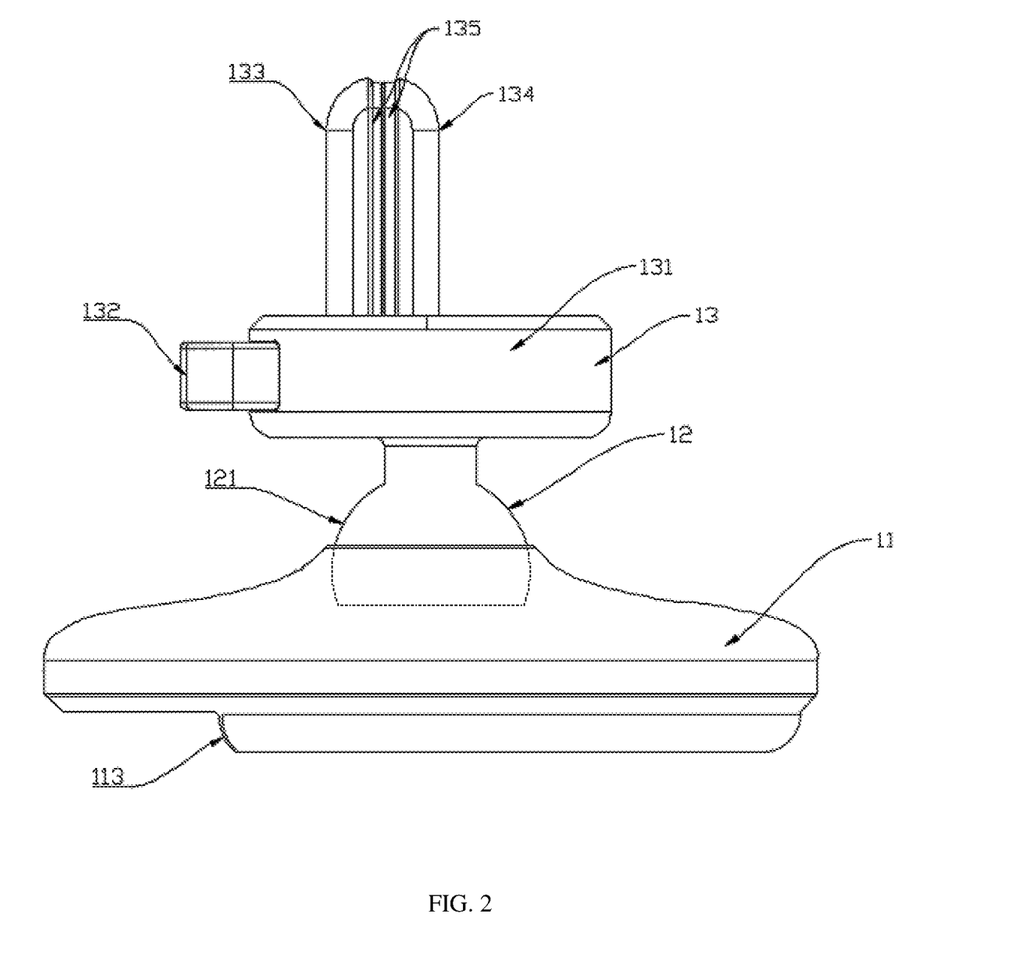
FIG. 2 is a left view of FIG. 1.
Figure 3:
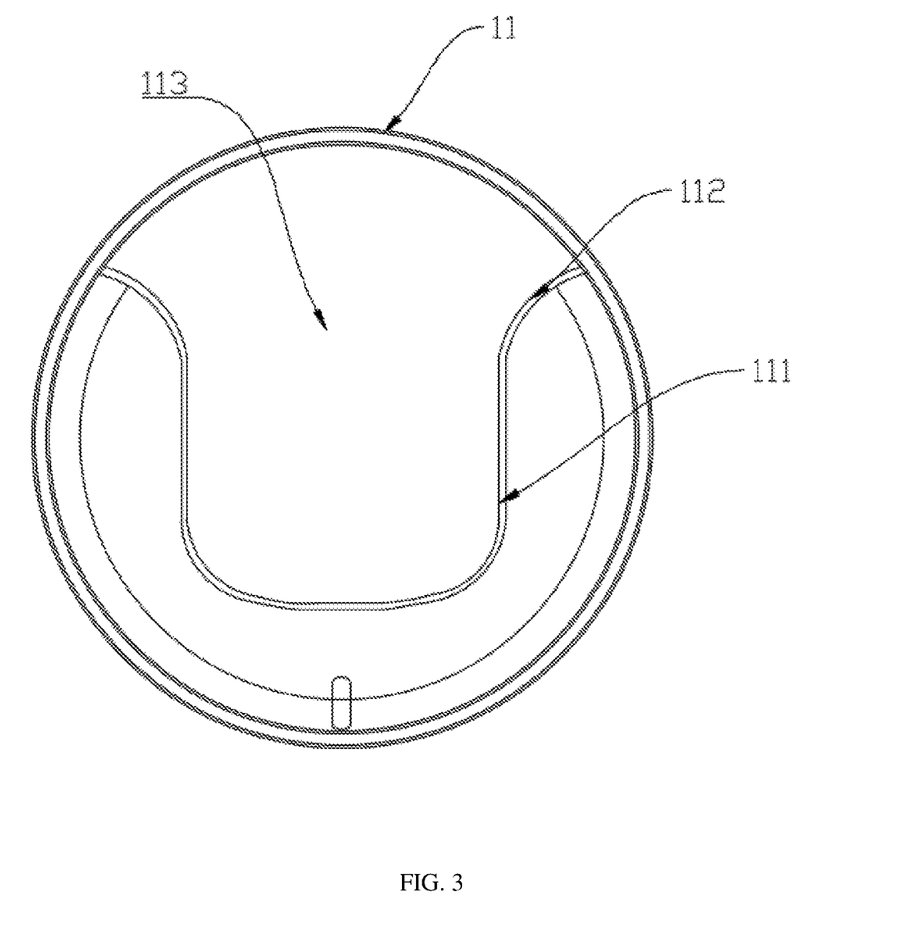
FIG. 3 is an upward view of FIG. 1.

A vehicle-mounted mobile phone holder refers to FIG. 1 to FIG. 5, the mobile phone holder 11 comprises a first connecting part 11, a second connecting part 13 and a middle part 12; the first connecting part 11 is used for being connected to a mobile phone, at least one card slot 111 is formed in the first connecting part 11, and at least one card entrance 113 is formed in the card slot 111;

The middle part 12 at least comprises a universal connecting end 121, the universal connecting end 121 is connected with the first connecting part 11 or the second connecting part 13; and the second connecting part 13 is used for being connected onto an automobile.

The ring buckle 20 is fixed onto the holder in a clamping manner, single-hand taking can be realized, and the operating state (such signal) of the mobile phone is not influenced, particularly, the wireless charging function of the mobile phone cannot be influenced, and moreover, the adjustment for the mobile phone in any angle can also be realized.

As a preferred embodiment of this disclosure, the card slot 111 is a U-shaped card slot 111, and the slot wall of the U-shaped card slot 111 is an internally inclined plane.

As the preferred embodiment of this disclosure, a guiding part 112 is arranged at the position of the card entrance 113 and is used for guiding a ring into the card slot 111. Through the arrangement of the guiding part 112, the mobile phone is convenient to clamp into the holder.

As the preferred embodiment of this disclosure, the first connecting part 11 is internally provided with a wireless charging module for wirelessly charging the mobile phone. When the holder is used, the holder is connected onto a vehicle-mounted power supply just by using a power line, namely the mobile phone with the wireless charging function can be charged.

As the preferred embodiment of this disclosure, one end of the middle part 12 is a universal connecting end 121, and the universal connecting end 121 is connected to the first connecting part 11. The universal connecting end 121 is of a universal ball structure, and can be connected into a groove in the first connecting part 11 in a rotating manner.

As the preferred embodiment of this disclosure, the connection of the second connecting part 12 is one of clamping connection manner and adhering connection manner. The second connecting part 13 is fixed onto the instrument desk through double-faced adhesive tapes in the adhering manner.

As the preferred embodiment of this disclosure, this disclosure is fixed to an air outlet of an air conditioner in the clamping connection manner; and the specific structure is as follows: the second connecting part 13 comprises an opening and closing wrench 132, a first clamping plate 133, a second clamping plate 134, a shell 131 and a spring, the opening and closing wrench 132 and the second clamping plate 134 are in sliding fit with the shell 131, the opening and closing wrench 132 is connected with the second clamping plate 134, the first clamping plate 133 is fixedly matched with the shell 131; and the spring is arranged inside the shell 131 and acts on the opening and closing wrench 132.

In order to prevent the clamping plates from sliding between the air outlet and a guiding plate, as the preferred embodiment of this disclosure, anti-skid layers 135 are arranged on the inner side of the first clamping plate 133 and the inner side of the second clamping plate 134 respectively. The antiskid layers 135 can be emulsion layers or foam layers.

Figure 4:
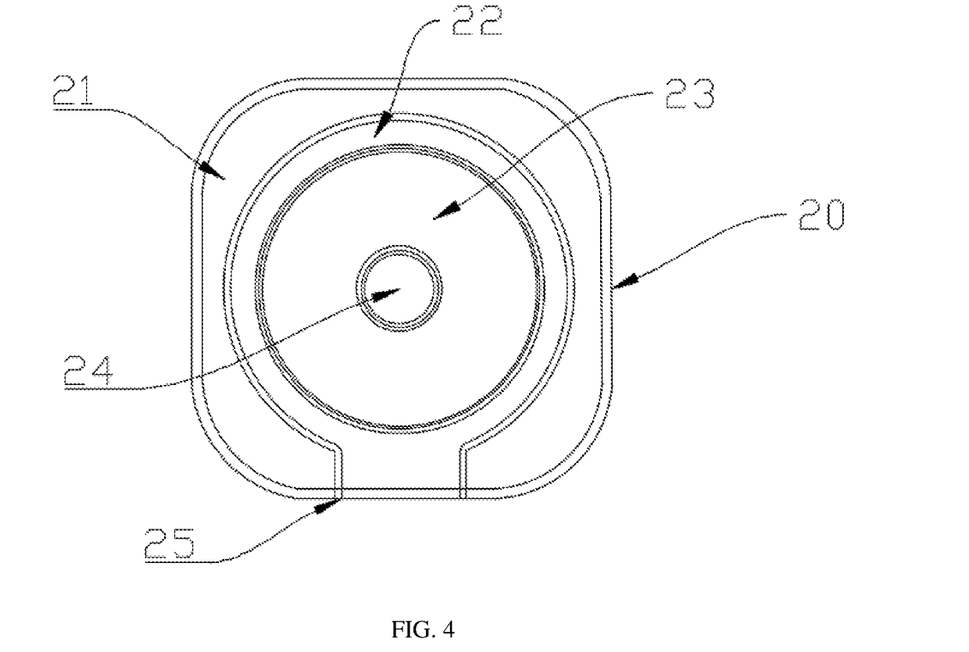
FIG. 4 is a structure diagram of the ring buckle.
Figure 5:
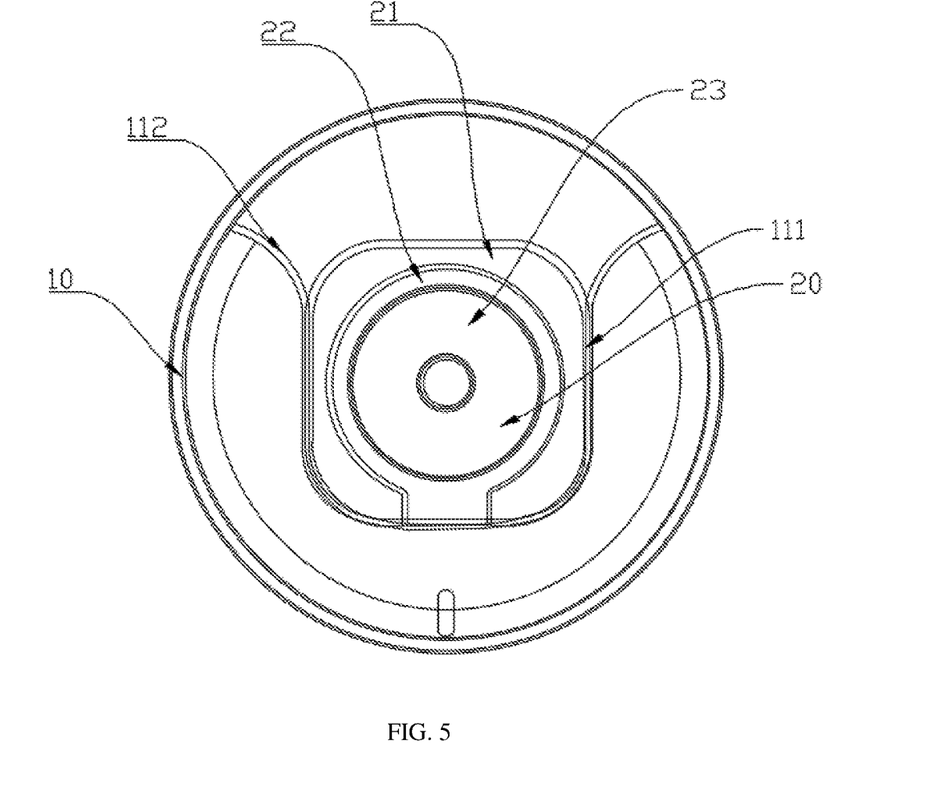
FIG. 5 is a structure diagram that the ring buckle and the holder are connected together.

The ring buckle 20 matched with the vehicle-mounted mobile phone holder 10 for use refers to FIG. 4 and FIG. 5, the ring buckle 20 comprises a buckle part 21, a rotary part 22 and a fixed part 23, the buckle part 21 is connected to the rotary part 22 through a connecting shaft 25, the rotary part 22 is connected onto the fixed part 23 through a rotating shaft 24, the fixed part is adhered into the mobile phone, the buckle part 21 can be clamped onto the vehicle-mounted holder, and the ring buckle 20 is preferably made of nonmetal. Certainly, it should be known that the ring buckle 20 also can be made of metal under the condition that wireless charging is not influenced.

The profile of the ring buckle 20 is preferably in the shape of a circle or a similar circle, and the ring buckle 20 can be put into the holder at any angle.

As the preferred embodiment of this disclosure, the outer wall of the buckle part 21 is arranged in an inclined manner, and the inclination direction is opposite to the slot wall of the card slot 111 of the vehicle-mounted holder.

When the holder is used, the vehicle-mounted mobile phone holder 10 is fixed into the guiding plate at the position of an air conditioner opening inside the automobile, the wireless charging module inside the holder is connected onto the vehicle-mounted power supply through the power line, then the ring buckle 20 is adhered onto the mobile phone, and the ring buckle 20 is clamped onto the holder through the card slot 111 so as to complete connection and charging of the mobile phone.

Embodiment II

Figure 6:
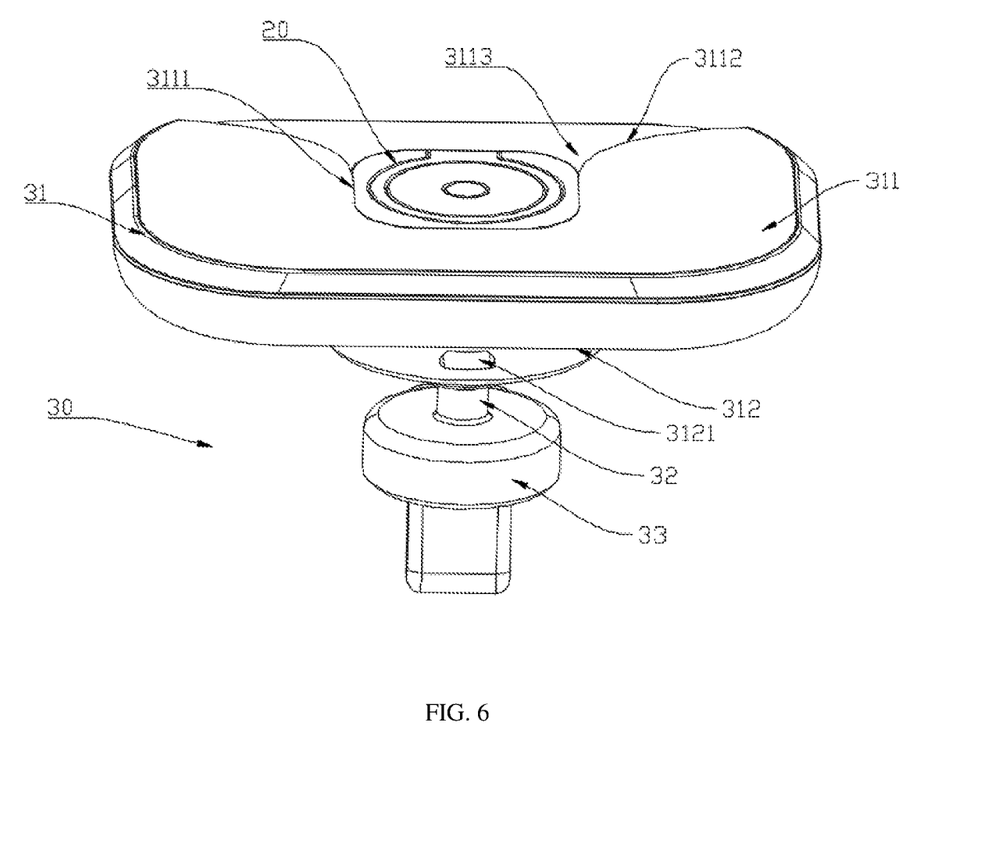
FIG. 6 is a solid structure diagram of a vehicle-mounted mobile phone holder.
Figure 7:
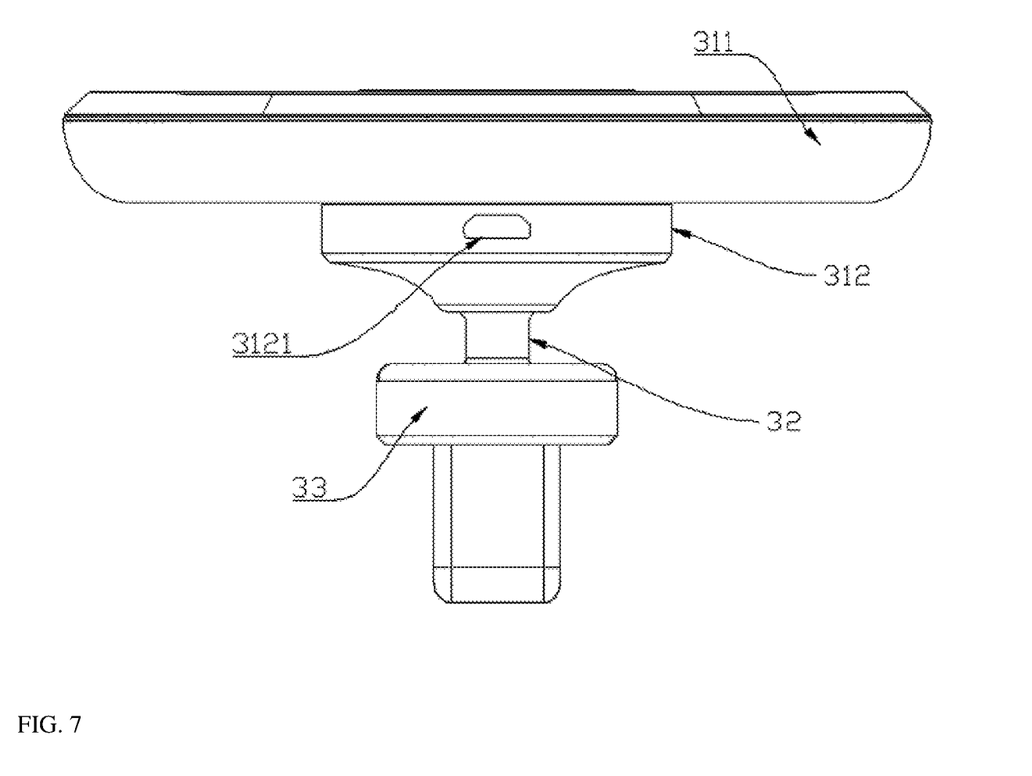
FIG. 7 is a front view of FIG. 6.

A vehicle-mounted mobile phone holder refers to FIG. 6 and FIG. 7, the mobile phone holder 30 comprises a first connecting part 31, a second connecting part 33 and a middle part 32; the first connecting part 31 is used for being connected to a mobile phone, the first connecting part 31 comprises an upper connecting part 311 and a lower connecting part 312, at least one card slot 3111 is formed in the upper connecting part, at least one card entrance 3113 is formed in the card slot 111, and a guiding part 3112 is arranged at the position of the card entrance 3113; the upper connecting part 311 and the lower connecting part 312 are connected together detachably, and the upper connecting part 311 is internally provided with a storage battery and a wireless charging module; a charging port is formed in the lower connecting part, and when the upper connecting part and the lower connecting part are connected together, the storage battery inside the upper connecting part is charged;

The middle part 32 at least comprises a universal connecting end 321, the universal connecting end 321 is connected with the first connecting part 31 or the second connecting part 33; and the second connecting part 33 is used for being connected onto an automobile.

By adopting the above structure, vehicle-mounted charging and mobile charging can be realized, and the holder is more convenient to use.

The upper connecting part 311 and the lower connecting part 312 are connected together detachably in a magnetic adsorption manner, for example, the lower connecting part is internally provided with a magnet, and an iron sheet is arranged on the contact surface of the upper connecting part and the lower connecting part.

The foregoing descriptions are merely specific embodiments of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A vehicle-mounted mobile phone holder comprising:
   a first connecting part;
   a second connecting part; and
   a middle part;
   wherein the first connecting part is used for being connected to the mobile phone;
   at least one card slot is formed in the first connecting part, and at least one card entrance is formed in the card slot;
   the middle part at least comprises a universal connecting end, the universal connecting end is connected with the first connecting part or the second connecting part, and the second connecting part is used for being connected onto an automobile
   wherein the first connecting part is internally provided with a wireless charging module for wirelessly charging the mobile phone and the first connecting part comprises an upper connecting part and a lower connecting part, the card slot is formed in the upper connecting part, the wireless charging module is arranged inside the upper connecting part, and the upper connecting part is further internally provided with a storage battery; a charging port is formed in the lower connecting part, the upper connecting part and the lower connecting part are connected detachably, and when the upper connecting part and the lower connecting part are connected together, the storage battery inside the upper connecting part can be charged.

2. The vehicle-mounted mobile phone holder according to claim 1, characterized in that the card slot is a U-shaped card slot, and the slot wall of the U-shaped card slot is an internally inclined plane.

3. The vehicle-mounted mobile phone holder according to claim 2, characterized in that a guiding part is arranged at the position of the card entrance and is used for guiding a ring into the card slot.

4. The vehicle-mounted mobile phone holder according to claim 1, characterized in that one end of the middle part is a universal connecting end, and the universal connecting end is connected to the first connecting part.

5. The vehicle-mounted mobile phone holder according to claim 4, characterized in that the connection of the second connecting part is one of clamping connection manner and adhering connection manner.

6. The vehicle-mounted mobile phone holder according to claim 5, characterized in that the second connecting part comprises an opening and closing wrench, a first clamping plate, a second clamping plate, a shell and a spring, the opening and closing wrench and the second clamping plate are in sliding fit with the shell, the opening and closing wrench is connected with the second clamping plate, the first clamping plate is fixedly matched with the shell, and the spring acts on the opening and closing wrench.

\* \* \* \* \*